UNITED STATES PATENT OFFICE 2,658,099

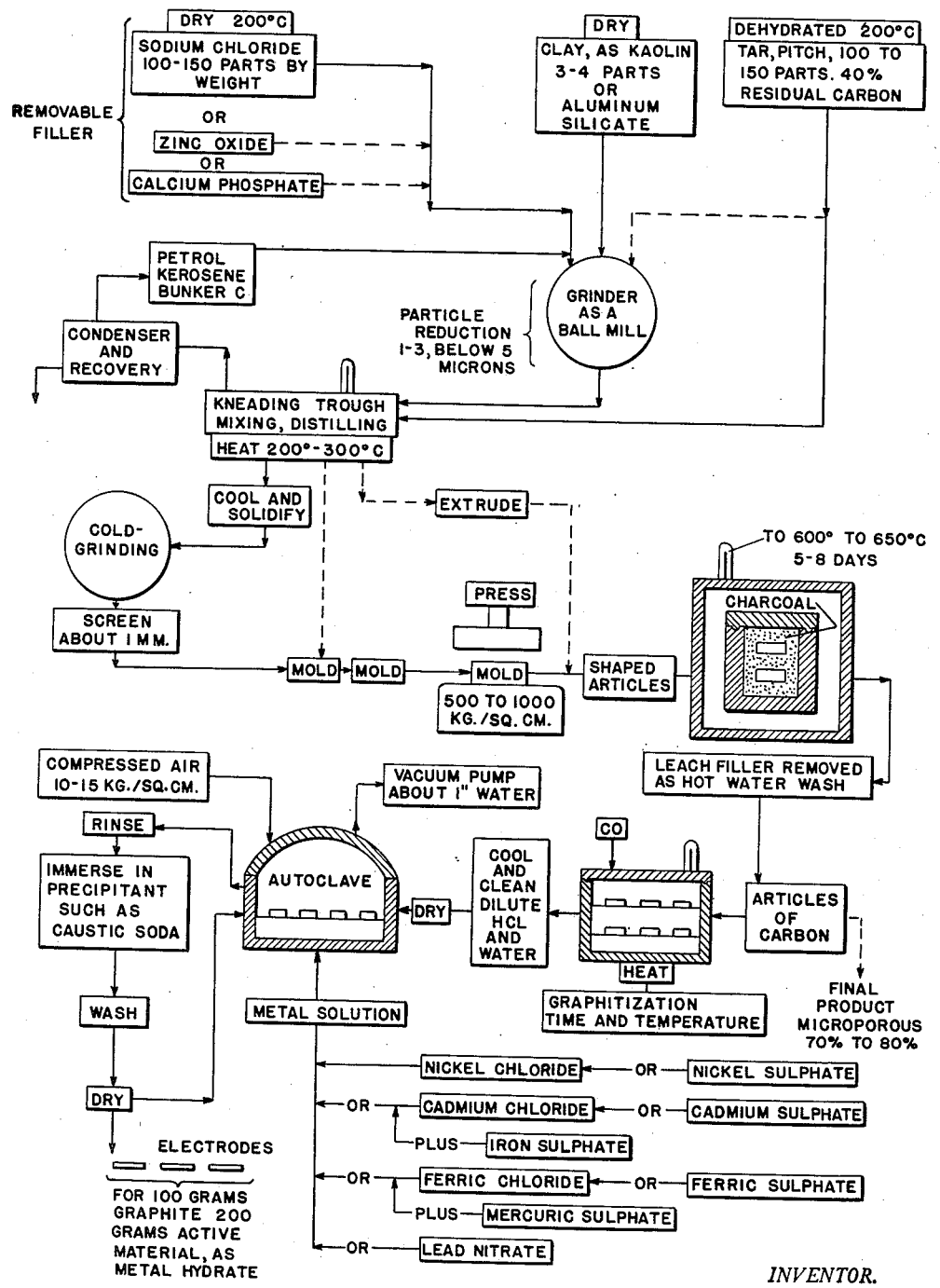

MICROPOROUS CARBON AND GRAPHITE ARTICLES, INCLUDING IMPREGNATED BATTERY ELECTRODES AND METHODS OF MAKING THE SAME

Lucien Paul Basset, Montmorency, France

Application October 11, 1949, Serial No. 120,646

Claims priority, application France October 20, 1948

15 Claims. (Cl. 136—121)

This invention relates to new articles of manufacture of carbon or graphite, more specifically to battery electrodes, and to methods of producing them.

It is an object of the invention to provide in carbon or graphite articles, not only a homogeneous porosity, but also a porosity characterized by exceedingly small pores, of the order of a few microns, generally less than five microns across the larger dimension.

It is a further object of the invention to provide battery electrodes in which the multiplicity of small pores are filled with active material with the interconnecting matrix exceedingly thin, and the openings through the matrix microporous in size, both of the order of a few microns, thereby to provide an efficiency of use of the active material higher than has heretofore been attained and of such increased efficiency as to provide a battery which in itself may be considered a product not heretofore known to those skilled in the art.

In accordance with the present invention, the new articles of manufacture, either of carbon or of graphite, are characterized by a microporosity of a new and higher order than heretofore attained. The new and improved battery electrodes have a higher electrochemical efficiency, that is, a higher coefficient of use of the active material than has heretofore been attained by reason of the microporous structure, which greatly increases the active surface areas of the active material deposited in the micropores of the carbon or graphite electrode. The porosity achieved with the pores of the size of the order of a few microns has made possible the attainment of a high ratio of the weight of the active material deposited to a given weight of the graphite or carbon electrode.

Graphite, both in its natural and artificial form, has not been satisfactory for storage battery applications because of its high density, of the order of from 1.03 to 1.65 and its low porosity, for example, 100 grams absorbing only 12 grams to 15 grams of water under a vacuum corresponding with one inch of water. In accordance with the present invention, formed articles, such as graphite electrodes, have a porosity of the order of 100% to 125% and above. In other words, 100 grams of microporous material produced in accordance with this invention are capable of absorbing from 100 grams to 125 grams, or more, of water under a vacuum of one inch of water. The porosity in terms of ratio of voids to total volume is of the order of from 75% to 80%. The density (the weight in grams of one cubic centimeter) is 0.65 and in terms of one active battery material, 100 grams of graphite produced in accordance with this invention can contain 200 grams, or more, of nickel hydrate. For the same weight or space, such a battery electrode will impart to the alkaline type of storage battery a capacity considerably greater than that heretofore attained.

In accordance with the present invention, however, more has been done than merely to increase the porosity of the battery electrodes. Because of the low conductibility of metal hydrates, such as nickel hydrate, which have heretofore been used as the active material in storage batteries of the alkaline type, the chemical reaction occurs only at the immediate junction between the metal hydrate and the supporting and conducting element which carries the current. I have found that the chemical action in the region of contact between the active material and the conducting element extends through a thickness of only about a thousandth of a millimeter (one micron) into the active material and that any active material exceeding a micron in thickness is ineffective to contribute to the electrochemical reaction. By providing, in accordance with the present invention, pores individually approaching the size of one micron, practically all of the active material within each pore is made effective to increase the over-all electrochemical efficiency to a degree which imparts to the battery the unexpectedly large ampere-hour capacity, as well as watt-hour capacity, which has heretofore been notably absent from storage batteries of the alkaline type of comparable size.

From the foregoing it will be observed that while the electrochemical capacity of the electrode is proportional to the weight of active material or metal oxide introduced into the pores (the amount being limited by the degree of porosity), the efficiency of use of the active material or metal oxide so introduced is proportional to the surface development of the electrode. For higher efficiency of use of the active material, microporosity is provided, meaning that the pores are of the order of a few microns; for example, 1 to 5 microns, with similar dimensions for the walls of the graphite matrix.

While carbon electrodes have heretofore been proposed for battery applications, they have not been satisfactory for the reason that oxygen given off at the anode during the charging of the battery oxidizes the agglomerated carbon, which has heretofore characterized the electrode.

The oxygen is produced either with an alkaline or acid electrolyte. By employing graphite in accordance with the present invention, the foregoing oxidizing reaction is avoided inasmuch as the graphite is not subject to any significant anodic oxidation.

Summarizing, battery electrodes in accordance with the present invention have the following characteristics:

1. The high degree of porosity provides a battery electrode in which the weight of active material is equal to, generally greater than, that of the supporting and conducting element in which the active material is deposited.

2. The porosity is characterized by the small size of the pores, of the order of a few microns in diameter.

3. The battery electrodes are made of graphite to resist anodic oxidation.

Now that the nature of my invention has been explained, it will be understood that due to the greater efficiency of use of the electrochemically active material of the electrodes, a less amount of active material can be used to obtain ampere-hour capacities equal to those of alkaline batteries now available on the market and that ampere-hour capacities considerably greater than the alkaline batteries now on the market can be produced with the same amount of active material. Moreover, with the high degree of porosity obtained in the microporous graphite electrodes of this invention, it is possible to obtain the same ampere-hour capacity with smaller batteries than the alkaline batteries of existing types, both as regards volume and weight.

For a further understanding of the invention, particularly with reference to the process of producing microporous carbon and graphite articles including battery electrodes, and the like, reference is to be had to the accompanying drawing in which appears a flow diagram illustrative of the various steps to be performed, typical materials used, and most of the conditions of treatment.

The raw materials used in the present process comprise tar, either from petroleum or coal, pitch, and the like, in which there is present approximately 40% by weight of residual carbon. To 100 parts by weight of tar at 200° C. there is added a removable filler capable of reduction to particle sizes of the order of a few microns; i. e., from 1 to 3 microns, and, if needed for the purpose, a catalyst for facilitating graphitization, such as alumina or aluminum silicate available in the form of clay, as kaolin. The filler may comprise from 125 to 150 parts by weight depending upon the desired porosity.

Zinc oxide, though relatively costly, may be utilized as the removable filler, the particles of zinc oxide being commercially available in the required degree of fineness. After carbonization, as later explained, such particles may be removed with an acid, such as sulphuric acid, or the zinc may be vaporized and distilled during heating at high temperature, as during the graphitization.

Salts soluble in water may also comprise the removable filler, common sea salt (sodium chloride) having been found particularly suitable in accordance with further aspects of the present invention. Calcium phosphate may be used; other substances, as some oxides, may be used, if capable of reduction to the desired particle size, with heat-resistant characteristics, that is, retention of form and composition below 700° C. and if removable without adverse effects upon the pore size and the pore-containing matrix.

In a preferred form of the invention, the particle size of the sodium chloride is reduced in mixture with a dehydrated liquid. For example, it has been found that by drying the sodium chloride, as for example at 200° C. and mixing it with a petroleum distillate such as kerosene or Bunker C, as shown by the solid line in the drawing, the particle sizes may be reduced in a suitable grinder, for example, a ball mill, to the requisite degree of fineness of from 1 to 3 microns and averaging below about 5 microns. For the grinding operation two parts by weight of sodium chloride may be mixed with one part of the petroleum fraction. After grinding for an adequate period of time, the petroleum fraction, as the kerosene, and the sodium chloride appear as a creamy mixture or slurry.

It has also been found that the particle size of the sodium chloride may be similarly reduced by grinding in mixture with the tar as indicated by the broken line in the drawing leading to the grinder illustrated as a ball mill. If the tar, heated to 200° C. is not free-flowing, the required amount of the petroleum fraction is added, since the tar should be free-flowing in the grinding and mixing operations.

After reduction of the particle size to the required degree of fineness, the mixture from the grinding operation is transferred to a drying chamber, preferably in the form of a kneading trough, as a heated mixer or a heated homogenizer. The mixing is continued, with addition of the tar or pitch, to insure uniform dispersion of the filler particles throughout the mixture. The tar or pitch agglomerates the particles while the added heat distills therefrom the petroleum fraction and volatile fractions from the tar. The heating may be delayed until uniform dispersion of the particles throughout the tar is achieved, but concurrent mixing and heating is preferred. It has been found that about 300° C. will be a satisfactory temperature for adequate distillation of the volatile products from the tar or pitch.

A catalyst, such as aluminum silicate in the form of clay, as kaolin, which has been dried at a temperature of the order of 100° C. may be added, three to four parts by weight, to the mixture in the kneading trough or homogenizer, but preferably is added to the removable filler prior to or during the grinding in the ball mill. Introduction of the catalyst into the ball mill insures particle size reduction thereof, particularly of aggregates.

After completion of the kneading and the distillation of the volatile products, the mixture, with the filler and clay thoroughly and uniformly dispersed therein, is preferably cooled for solidification and in preparation for the next step of converting the solid mixture to particles of small size. This step is carried out under reduced temperature, preferably not in excess of 30° C. The solid material may be cold-ground or pulverized to form the particles of small size; the average size being preferably of the order of one millimeter, i. e., which will pass through a No. 18 sieve, for molding under pressure. The particles are then transferred to a mold having a shape corresponding with the desired final product and molded under a pressure of from 500 kilograms to 1000 kilograms per square centimeter. It has been found that the material can be satisfactorily molded into various shapes without adverse effect on its subsequent porosity and that the molded product will have sufficient rigidity to retain its shape during the subsequent treatment thereof. While it is preferred to mold the articles into substantially the desired shape, it is possible to produce shapes in the form of sheets or tubes by pressing, rolling, or extruding the fine particles produced in the grinding operation described above for subsequent fabrication into the final product.

Alternatively, the hot material may be transferred from the kneading trough directly to an extruding apparatus for pressure formation of rods, tubes or plates, or to a press for molding. It is deemed feasible to hot-press the material though, as indicated, it is more convenient to first cool and grind the same for subsequent molding.

After molding, the products are placed upon a supporting bed, preferably of fine charcoal, within a suitable box, made of iron or a heat-resistant ceramic, with a closure to provide a substantially airtight enclosure with fine charcoal both above and below the molded products. The charcoal is tamped as by a shaking table. The boxes including the molded products are then heated to a temperature not to exceed 700° C. The substantially airtight boxes and the charcoal therein provide a reducing atmosphere, that is, one which excludes or prevents oxidation of the shaped articles during carbonization.

If desired, the carbonization may be carried out in a reducing atmosphere, such as carbon monoxide, in which case the boxes need not be used. The shaped articles will then be suitably supported within the carbonizing furnace.

It is an important aspect of the present invention that the heating be uniformly progressive so that a temperature of the order of 650° C. and always less than 700° C. shall be attained in from 5 to 8 days. The purpose of this baking operation is to drive off additional volatile material and this must take place slowly so that the articles will harden without rupture. The driving off of the volatile material must not occur with such rapidity as to break the pressure bonds between the carbon particles or to produce cracks in the material. The temperature must be below the melting temperature of the filler, which for salt is approximately 800° C. and below the temperature which will cause material-cracking dilation of the filler. The indicated heating to below 700° C. meets all requirements.

It has been found that uniformly progressive heating over a period of 5 to 8 days to attain the top temperature of around 650° C. will not produce within the article a rate of flow of the volatile materials in excess of the flow rate characteristics of the volatile materials through the material and will entirely avoid minor explosions and excessive stresses within the material which would, if present, result in cracking and breaking of the articles, which has been found to occur as the result of too rapid heating, and temperatures in excess of 700° C.

After the attainment of the final baking temperature the ceramic or iron boxes are cooled and the articles removed. After cleaning to remove any charcoal which may have adhered thereto, the articles with the water-soluble filler are treated with a leaching agent such as hot water, for example at a temperature of around 60° C. The leaching or hot water treatment serves to dissolve the filler. Preferably the hot water treatment is repeated a number of times to insure complete removal of the water-soluble salt (sodium chloride), after which the articles are dried. The zinc oxide filler or the calcium phosphate filler may be removed by treatment with dilute sulphuric acid, e. g., 4% to 5% solution of sulphuric acid.

After removal of the filler, the resulting articles are substantially entirely carbon though retaining a small amount of clay. Such articels at this point in the process have the characteristic of the high microporosity above described and may be used for filtering, purification and other applications, for which porous carbon may be used. The porosity is of the order of 100% and above in terms of water absorption. The ratio of voids to total volume will be of the order of from 75% to 80%, including the natural porosity of the carbon.

New products or articles of graphite may be produced from such porous carbon articles by graphitizing processes known to those skilled in the art. Alumina may be used as the graphitizing catalyst. However, in accordance with the present invention, the active ingredient in the kaolin for graphitization is aluminum silicate which is present in amount equal to approximately 42% by weight of the kaolin and not only aids in the conversion of carbon to graphite, but also adds strength by formation of silicon carbide. The dried articles may again be placed in iron or ceramic boxes in spaced relation with each other, the boxes being substantially airtight to prevent oxidation.

In lieu of the boxes, with are effectively hermetically sealed, the graphitization may take place in a reducing atmosphere, as for example, in a furnace preferably of the resistance type having a carbon monoxide atmosphere.

The furnace may also be of the Acheson type where the articles are baked with gas coke within the furnace to form a high resistance current path between the carbon electrodes disposed at opposite ends thereof.

For graphitization, the heat cycle is preferably carried out as follows:

The heat cycle for graphitization may be varied within relatively wide limits in accordance with graphitization technique known to those skilled in the art, care being taken to elevate the temperature from about 600° C. to 1200° C. at a rate which will not produce cracks in the carbon articles. It has been found that the porosity of the carbon articles, such as the electrodes, is retained after the graphitization thereof.

Both slow and rapid graphitization of the carbon articles have been utilized. In the former case, after attainment of the temperature of 600° C., heat is generated to raise the temperature at the rate of about 50° C. per day until attainment of a temperature of between 800° C. and 1000° C. Added heat then elevates the temperature at the rate of from 150° C. to 200° C. per day until attainment of a temperature from 2400° C. to 2700° C. After a suitable time, less than a day, at 2700° C., the furnace temperature is gradually reduced, over a period of a day, to room temperature and the improved graphitized articles removed.

The more rapid graphitization process, now to be outlined, is preferred. The generation of heat is controlled to elevate the temperature of the graphitization furnace from 600° C. to 1200° C. at the rate of about 200° C. per hour. The temperature of 1200° C. is maintained for three or four hours and is then raised at the rate of about 200° C. per hour to within the range of the final graphitization temperature of from 2400° C. to 2700° C.

After completion of graphitization, the articles are removed from the furnace, cooled and cleaned, as with a dilute solution of hydrochloric acid and then with water to remove iron and other soluble impurities.

The graphitized articles are per se useful because of their high porosity. They have unusually good strength for articles with such a high degree of porosity, such strength being due to the reaction between the vapors of the silicate and of the carbon to form silicon carbide. They are highly suitable for battery electrodes.

The graphitization may also be carried out by surrounding the articles with carbon, as coke, and in the presence of silica. The carbon and silicon in vapor form permeates the articles and forms in the cellular wall structure a slight amount of silicon carbide for increased strength of the electrodes.

Where zinc oxide is used as the filler, it is desirable to add to the tar finely ground coke, i. e., coke dust, to assist in the removal of the zinc oxide during graphitization, the added coke serving to minimize pore enlargement during removal of the zinc.

As applied to storage battery electrodes, the graphitized articles are now placed within an autoclave and subjected to a high degree of vacuum, at least 99% of a perfect vacuum, and preferably of the order of one inch of water. All occluded air is thereby removed, preparing the articles for the introduction of active material to be uniformly dispersed therethrough. A 10% to 20% solution of active material for the battery electrode, such as a nickel chloride solution is then introduced into the autoclave, which solution enters into and travels through the pores of the microporous articles.

The initial introduction of the solution into the microporous electrode is accelerated by the application of atmospheric pressure for two to four hours. The electrodes are then removed from the autoclave, rinsed in water, drained, and introduced into an alkaline solution which, for the nickel electrode, may be a solution of caustic soda, of 20° Baumé. The electrodes are immersed for 24 to 48 hours, and there is precipitated or deposited from the nickel chloride solution nickel hydroxide or nickel hydrate which remains in the pores. The chemical reaction is as follows:

$$NiCl_2 + 2NaOH \rightarrow Ni(OH)_2 + 2NaCl$$

The electrodes are then washed in hot water (preferably without lime hardness) for 48 hours for complete elimination of the sodium chloride and any excess of caustic soda, and dried at 110° C.

The impregnation is completed by repeating the following cycle. The dried electrodes are returned to the autoclave, the high vacuum is applied, and a nickel chloride solution again introduced under vacuum with subsequent application of a super-atmospheric or gauge pressure of from 10 kilograms to 15 kilograms per square centimeter for a period of two to four hours. The electrodes are again rinsed. The foregoing precipitation or deposition process, as by the caustic soda, is repeated and the washing and drying operations carried out. The electrodes are again returned to the autoclave for the needed further cycles insuring optimum impregnation. Ordinarily four or five treatments of the electrodes within the autoclave will be adequate for the deposition within the pores of each 100 grams of graphite of 200 grams of nickel hydrate. The increase in weight after each cycle of treatment is a direct measure of the quantity of nickel hydrate absorbed or deposited within the electrodes. With four or five cycles of treatment there will remain in the electrode sufficient interstitial space both for the electrolyte and for expansion of the electrochemically active material during charge and discharge of the battery. With the active material distributed throughout the pores whose size average below 5 microns, the available active surface area is exceedingly large and is made even greater by pores whose size average below 3 microns, such size resulting from a corresponding average particle size of the filler. A pore size of about one micron has been attained and is advantageous because of the high increase in effective area of the active material deposited therein.

For negative battery electrodes having cadmium as the active material, the foregoing process is repeated with cadmium chloride in mixture with a solution of ferric sulphate, approximately 75% cadmium chloride and 25% ferric sulphate. Precipitation of cadmium hydrate and of ferric hydrate within the electrodes is brought about by treatment with caustic soda, as in the case of the nickel chloride.

For negative battery electrodes having iron as the active material, the foregoing process is repeated with a solution, ferric sulphate preferably in mixture with from 2% to 4% of mercuric sulphate. Ferric chloride may be used instead of the sulphate, but there must be included 7% to 8% of metallic iron in the solution. After each impregnation a suitable precipitant, such as caustic soda, is applied. The electrodes are then washed with water and dried at 30° C. in vacuum. In this manner the water can be removed without drying, that is, dehydrating, the ferric oxide, which would render the material electrochemically inactive. More specifically, the precipitation or deposition of the iron within the pores is in the form of $Fe_2(OH)_6$, also written as $$Fe_2O_3 \cdot 3H_2O$$

and forms the active material of the battery.

The necessary number of cycles of treatment will be used to produce the desired impregnation with iron or cadmium.

With the positive nickel electrodes and the negative cadmium or iron electrodes formed in accordance with the present invention, the ampere-hour capacity of the battery appears to be unexpectedly high, of a different order than that heretofore realized from storage batteries of the alkaline type of the same size. In consequence, the volume and weight of the electrodes needed for a battery equivalent to those now on the market can be greatly reduced. This represents an obvious advantage to those familiar with the space and weight requirements of the present alkaline battery.

If plates or shapes are broken in the course of manufacture, they may be used as a source of material for battery electrodes since they can be ground to particle sizes of 1 millimeter to 1.5 millimeters. This powder introduced into perforated or slotted tubes of non-conducting material, such as rubber, of 15-millimeter to 20-millimeter diameter, and pressed around a nickel core, produces cylindrical electrodes which may be preferred in certain cases to flat electrodes. There is retained in the particles of reduced size the microporous characteristics: each particle being made up of the homogeneous distribution of pores containing active material separated by wall of graphite, the pores and walls having maximum dimensions below 5 microns and preferably below 3 microns.

For electrodes for acid electrolytes, such as lead, a solution of lead nitrate is introduced into the graphite electrodes. In a subsequent sulphuric acid solution, the lead is reduced to the metallic state at the cathode of the electrolytic bath. Such electrodes by usual formation procedures may serve as positive or negative plates of a battery.

Now that the principles of the invention have been fully explained for a number of examples, it is to be understood that the method is also applicable to the introduction of other materials into the microporous carbon or the graphite either for storage battery electrodes or otherwise.

It is to be observed that in accordance with this invention all of the requirements of the alkaline type of storage battery have been met. The positive electrodes or plates of graphite are uniformly filled with nickel hydroxide, yet there is retained adequate porosity for a high coefficient of use of the active material. The needed conductivity for the positive plate is provided by the electrically conductive walls of graphite forming the porous structure of the plate. Not only is the nickel hydroxide precipitated as a result of its treatment with sodium hydroxide or caustic soda, but any residual sodium hydroxide, carbonates, chlorides and sulphates which may be present in the positive electrode or plate are removed by the subsequent leaching of washing of the electrode with hot water. There is avoided the need to use flake nickel or graphite particles and the special perforated nickel-plated steel structures heretofore characterizing the alkaline type of cell.

The negative electrodes or plates for the nickel-iron type of alkaline cell are also readily produced by the addition of the ferric chloride or ferric sulphate with adequate mercuric sulphate added to increase electrical conductivity. The active material $Fe_2(OH)_6$ together with the oxide of mercury is precipitated uniformly throughout the negative electrode or plate and upon first charging, the mercuric oxide is reduced to mercury and thereafter serves to increase the conductivity and to keep the iron active by overcoming the effect of traces of ferric oxide ($Fe_2O_3$) which is electrically inactive.

The production of the negative plates, including the cadmium hydrate and the ferric hydrate, has already been described. The positive plates for such batteries will, of course, be produced in accordance with the present invention as in the case of the positive electrodes for the nickel-iron type of cell above described.

Where electrochemically active material of a different character is desired, the process characterizing the present invention is carried on as has been explained above in the several examples, the requirement being that there be used a metal solution which can be precipitated in a form useful as, or capable of electrical conversion to, an active material within the pores of the electrode.

In the foregoing, there have been presented the proportions, the materials, and the conditions of operation for production of the new articles of manufacture, and particularly the battery electrodes of an improved and highly useful character. However, it is contemplated within the scope of the present invention that further changes can be made than those indicated. For example, the precipitant need not be caustic soda, but other suitable precipitants can be used, such as potassium hydroxide in the form of potash. The tar itself may include powdered coke and its residual carbon content may vary from the indicated 40%. Change in the residual carbon content of the tar will change the strength of the resultant product and its porosity. An increase in the residual carbon content for a given quantity of filler will result in a decrease in porosity and an increase in strength, and vice versa. However, even with decreased porosity the pore sizes will remain of the order of a few microns with a consequent high coefficient of use of the active material; only the thickness of the walls about the pores will be increased.

In one example, reference was made to 100 parts of tar of 40% residual carbon. In that example there were present 40 parts of residual carbon and 100 to 150 parts by weight of sodium chloride. The 40 parts by weight of carbon may also be taken as a measure of the ingredients to be used in the process providing that after the mixing and distilling operations, the volume of the material to be extruded or delivered to the press is approximately the same as with the 100 parts of tar having 40% residual carbon. Thus, there is considerable latitude in the raw material, tar, which may be used and, of course, there may be some variation from the foregoing requirement of 100 parts, or 40 parts, the range of from 100 to 125 parts of tar to be taken as preferred for battery electrodes. For applications other than to battery electrodes a greater porosity can be achieved by increasing the ratio of filler to a given tar, or by decreasing the ratio of residual carbon present in the tar after removal of the volatiles at about 300° C. in the mixing and distilling operations.

What is claimed is:

1. A fabricated shape of substantially pure carbon having a porosity characterized by pore sizes averaging below about 5 microns, an apparent density of not more than about 0.65, and said pores being uniformly distributed throughout the shape.

2. A fabricated shape of substantially pure carbon having a porosity of at least 70% to 80% by volume with the pore sizes averaging from 1 to 3 microns, and uniformly distributed throughout the shape.

3. A fabricated shape of substantially pure graphite having a porosity of at least 70% by volume with the pore sizes averaging below about 5 microns, said pores being uniformly distributed throughout said shape.

4. A battery electrode of substantially pure porous graphite, the pores thereof averaging below 5 microns in size, electrochemically active material deposited on the walls of said pores, and before the deposition of said active material characterized by a porosity of at least 70% by volume, said pores being uniformly distributed throughout said electrode.

5. A battery electrode of graphite characterized by an initial microporosity of about 70% by volume with the size of the pores averaging below 3 microns, said pores being uniformly distributed throughout the electrode, and active electrochemical material uniformly dispersed throughout the pores of the electrode, the walls separating the pores having an average thickness below about 3 microns.

6. A battery electrode of substantially pure porous graphite having an initial porosity of at least 70% by volume with the pores thereof averaging below about 5 microns in size and having uniformly distributed therethrough an electrochemically active material distributed over the walls of said pores in amount approximating 200 grams of active material per 100 grams of graphite, sufficient interstitial space remaining both to accommodate electrolyte and to provide for expansion of said active material during charge and discharge.

7. The battery electrode of claim 6 in which the electrochemically active material consists of a metal hydrate.

8. The method of producing highly porous carbon which comprises mixing together from 100 to 150 parts by weight of a finely divided removable filler selected from the group consisting of zinc oxide, calcium phosphate and sodium chloride and 100 parts of tar having a residual carbon content of approximately 40% by weight, during mixing elevating the temperature of the mixture for removal of volatiles from said tar, molding the resulting mixture into formed shapes, in a reducing atmosphere slowly elevating the temperature to, and thereafter maintaining the temperature at, about 650° C. and below 700° C. to convert the formed shapes into carbon, and thereafter removing said filler from said shapes to produce a microporosity of 70% and above by volume.

9. The method of producing highly porous carbon which comprises mixing together from 100 to 150 parts by weight of a finely divided soluble filler, and carbon in tar in quantity providing a carbon content of approximately 40 parts by weight, during mixing elevating the temperature of the mixture for removal of volatiles from said mixture, cooling the mixture to solidify the same, cold-grinding the solidified mixture for passage through a relatively fine screen, applying high pressure of the order of from 500 to 1000 kilograms per square centimeter to the screened mixture to form it into self-supporting shapes, in a non-oxidizing atmosphere slowly elevating the temperature to, and thereafter maintaining the temperature at, about 650° C. and below 700° C. to convert the formed shapes into carbon, and thereafter leaching said filler from said shapes to produce microporosity of the order of 50% by volume, and above.

10. The combination set forth in claim 9 in which a graphitizing agent is added in the mixing step and in which said carbonized shapes are gradually heated to a high temperature to convert them to graphite, and in which battery electrodes are formed as follows: subjecting the graphite shapes to high vacuum, while under high vacuum adding a metallic solution, increasing the pressure to atmospheric, rinsing the shapes, treating the shapes to precipitate within the pores a metal hydrate as active material, washing and drying the shapes in a plurality of cycles each as follows: (a) subjecting them to high vacuum, (b) immersing them in the metal solution, (c) applying a superatmospheric pressure of from 10 to 15 kilograms per square centimeter to said solution, (d) reducing the pressure to atmospheric, (e) rinsing the shapes, (f) precipitating additional metal hydrate, and (g) washing the graphite shapes, said shapes again being subjected to high vacuum in repetition of said cycle.

11. The method of producing highly porous graphite which comprises mixing together from 100 to 150 parts by weight of a finely divided soluble filler and 100 parts of tar having a residual carbon content of approximately 40% by weight whereby said filler particles are uniformly distributed throughout said tar, during mixing elevating the temperature of the mixture for removal of volatiles from said tar, molding the resulting mixture into formed shapes, in a reducing atmosphere slowly elevating the temperature to, and thereafter maintaining the temperature at, about 650° C. and below 700° C. to convert the formed shapes into carbon, thereafter removing said filler from said shapes to produce a microporosity of 70% and above by volume, and graphitizing said shapes.

12. The method of producing highly porous graphite which comprises grinding from 100 to 150 parts by weight of a soluble filler selected from the group consisting of calcium phosphate and sodium chloride whereby the particle sizes are reduced to below about three microns, mixing said filler particles thoroughly with and uniformly throughout 100 to 125 parts of tar having a residual carbon content of approximately 40% by weight, elevating the temperature for removal of the volatiles from said mixture, molding said mixture into formed shapes, in a reducing atmosphere slowly raising the temperature to, and maintaining the temperature at, about 650° C. and below 700° C. for a substantial time to convert said shapes into carbon, leaching said filler from said shapes whereby a microporosity of from 70% to 80% by volume is produced, and graphitizing said shapes.

13. The method of claim 12 wherein graphitization of said shapes is produced by raising the temperature thereof in a reducing atmosphere to from about 2400° C. to about 2700° C. at a rate of not more than 200° C. per hour.

14. The method of claim 12 wherein graphitization of said shapes is produced by raising the temperature to 600° C., thereafter raising the temperature to 1200° C. at the rate of about 200° C. per hour, maintaining the temperature of 1200° C. for from about 3 to 4 hours, and finally raising the temperature of said shapes to from about 2400° C. to about 2700° C. at a rate of not more than 200° C. per hour.

15. The method of producing highly porous carbon which comprises mixing together from 100 to 150 parts by weight of a finely divided removable filler selected from the group consisting of zinc oxide, calcium phosphate and sodium chloride and 100 parts of tar having a residual carbon content of approximately 40% by weight, and 3 to 4 parts of kaolin, during mixing elevating the temperature of the mixture for removal of volatiles therefrom, molding the resulting mixture into formed shapes, in a non-oxidizing atmosphere slowly elevating the temperature to, and thereafter maintaining the temperature at, about 650° C. and below 700° C. to convert the formed shapes into carbon, thereafter removing said filler from said shapes to produce a microporosity of the order of 70% by volume and above, in a reducing atmosphere elevating the temperature of said carbonized shapes to within the range of from 2400° C. to 2700° C. at a rate not exceeding 200° C. per hour to convert the carbonized shapes into graphite and to produce vapors of carbon and silicon for formation of silicon carbide within the graphite, after cooling, washing, cleaning and drying the shapes, applying suction to said shapes to produce a high vacuum thereon, while maintaining said vacuum introducing a metal solution for flow into the micropores of said graphite shapes, precipitating within said pores an active material, washing and drying said shapes and repeating the following cycle: (a) subjecting the washed shapes to high vacuum, (b) introducing said metal solution to the evacuated shapes, (c) elevating the pressure thereon to about 10 to 15 kilograms per square centimeter, (d) precipitating further active material from the added metal solution within the pores, and (e) washing the shapes, the microporosity of the graphite being high enough for precipitation therein in five to six cycles of 200 grams of metal solution for each 100 grams of graphite, and also porous enough for passage of electrolyte into contact with said active material.

LUCIEN PAUL BASSET.

References Cited in the file of this patent

UNITED STATES PATENTS

| Number | Name | Date |
|---|---|---|
| 266,172 | Maloney et al. | Oct. 17, 1882 |
| 325,822 | Coxeter | Sept. 8, 1885 |
| 347,023 | Berliner | Aug. 10, 1886 |
| 882,144 | Edison | Mar. 17, 1908 |
| 1,497,544 | Chaney | Jun. 10, 1924 |
| 2,189,889 | Engel | Feb. 13, 1940 |
| 2,356,076 | Moberly | Aug. 15, 1944 |
| 2,401,760 | Heyroth | June 11, 1946 |

OTHER REFERENCES

A. P. C. application of Engel, Serial No. 268,117, published April 27, 1943.